Patented Oct. 8, 1940

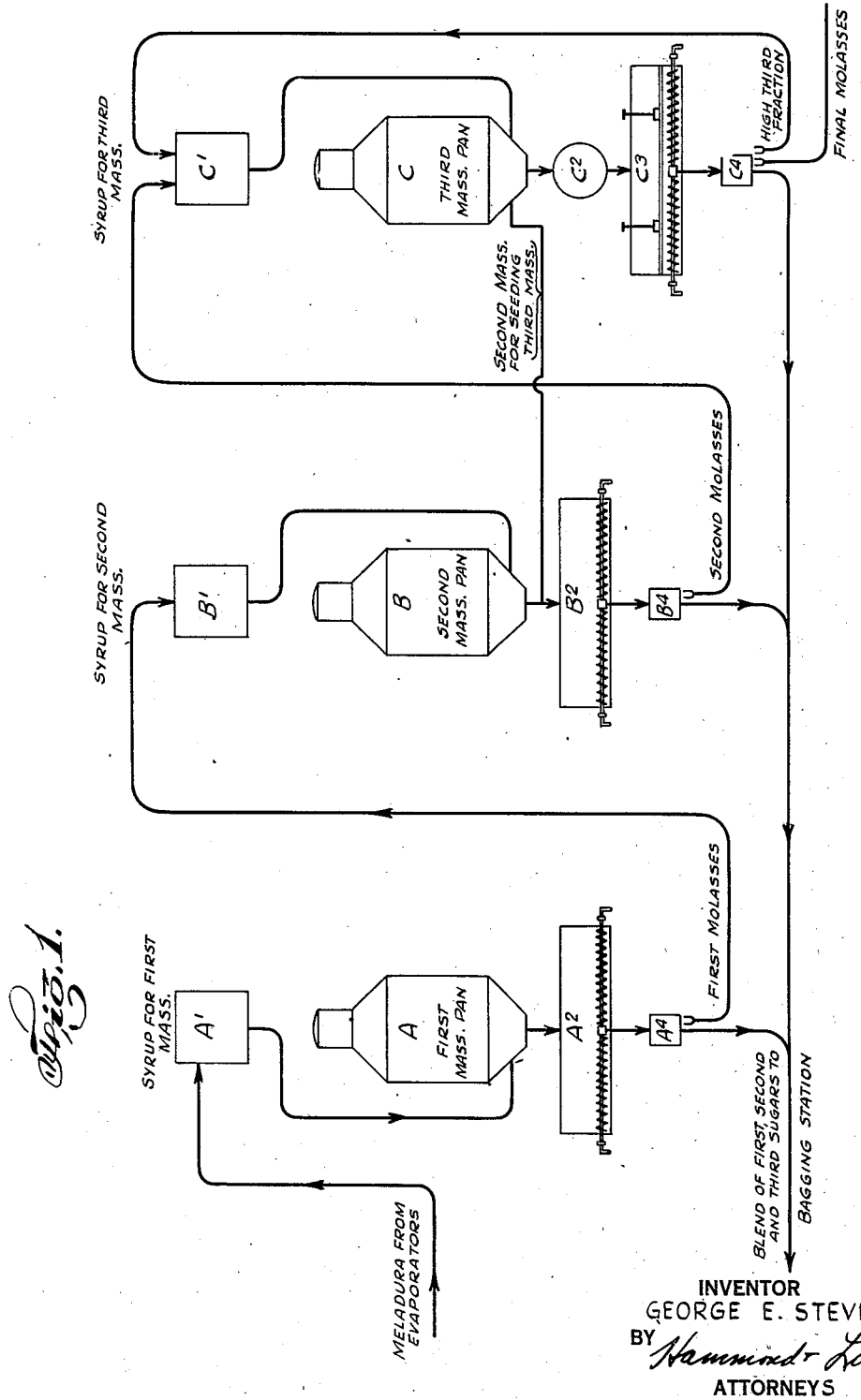

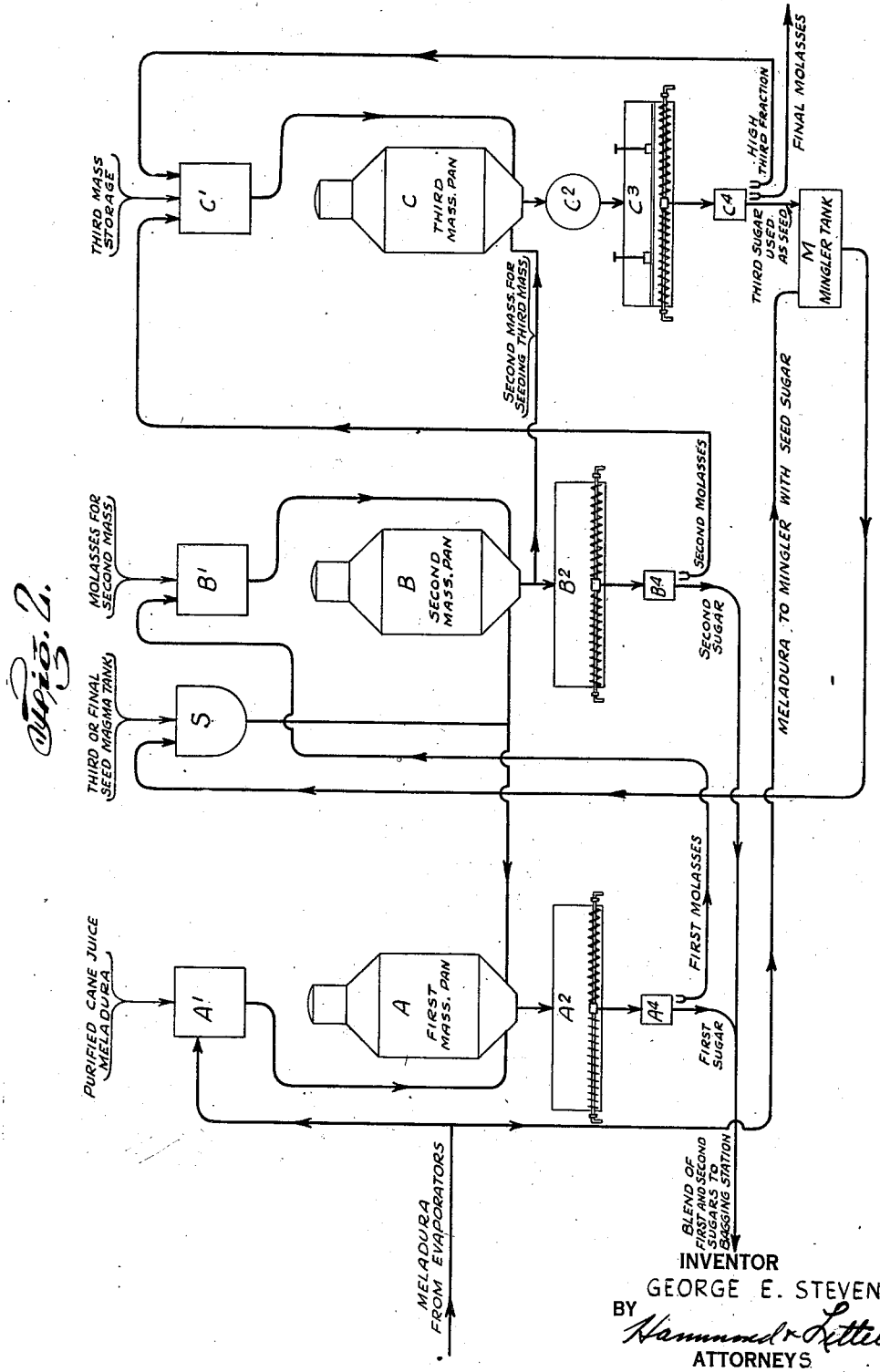

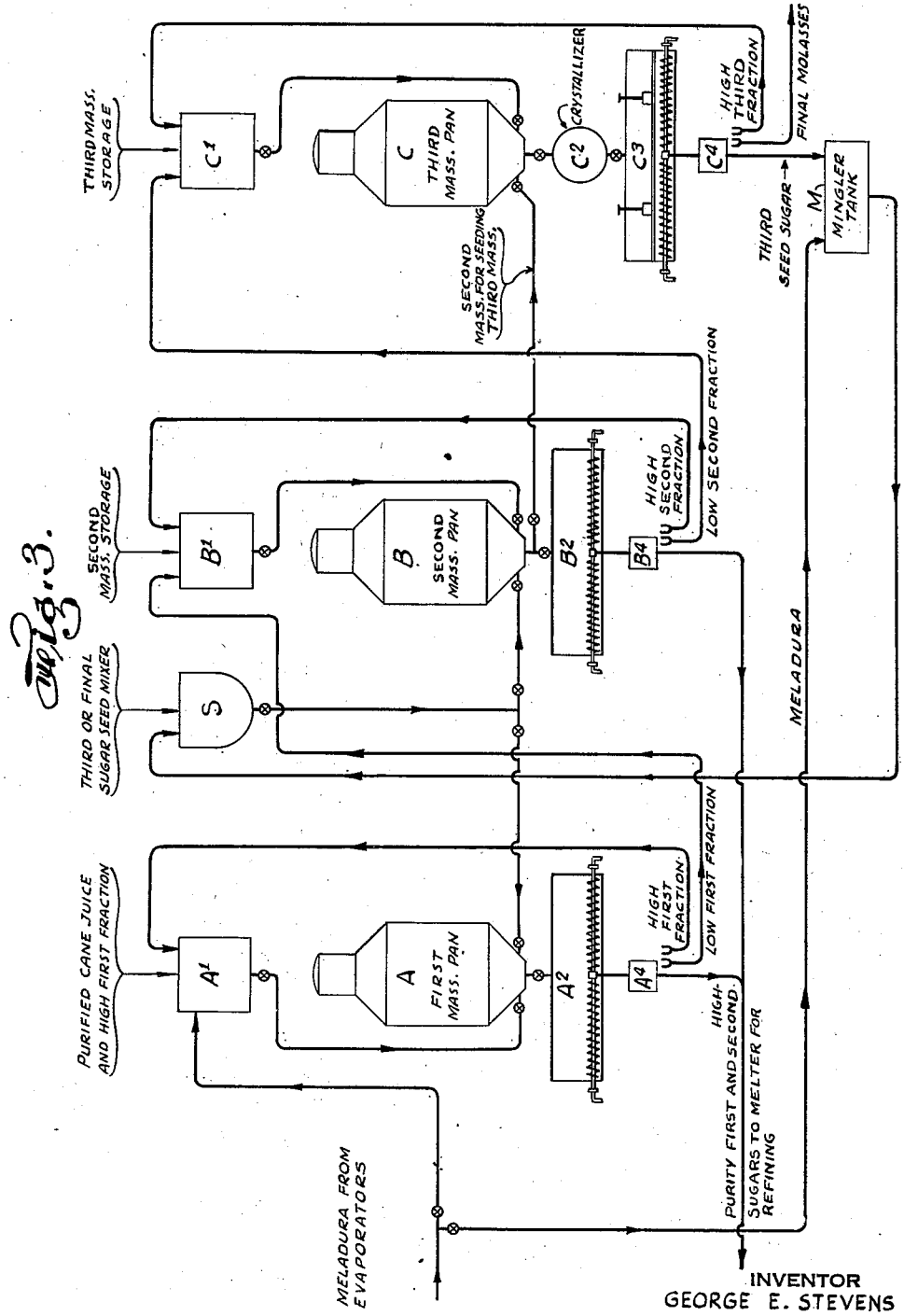

2,217,604

UNITED STATES PATENT OFFICE 2,217,604

MANUFACTURE OF CANE SUGAR

George E. Stevens, Denver, Colo., assignor to The Western States Machine Company, New York, N. Y., a corporation of Utah Application September 13, 1938, Serial No. 229,647

11 Claims. (Cl. 127—62)

This relates to new and useful improvements in the manufacture of sugar and, more particularly, to improved processes for producing raw cane sugar, plantation white sugar, or sugar of high purity for direct refining from the concentrated and partially purified syrup, or meladura, obtained from evaporators in conventional plantation raw sugar manufacture.

It is general practice in the cane sugar industry to make raw sugar of about 96° average polarization from meladura by a cyclical series of crystallization and centrifuging treatments and to convert this raw sugar into refined sugar by separate treatments in refineries where the raw sugar is first subjected to an affination, or washing, treatment to remove most of its impurities and then melted and passed into a cyclical refining process. In some places, meladura is processed into plantation white sugar, sometimes known as "turbanado," by double-purging and washing the higher purity sugars to obtain slightly colored sugar of about 98 to 99 purity.

The sugar making process in all forms is cyclical in nature and involves a sequence of crystallization and separating treatments on materials of successively decreasing purities, in the course of which crystalline products are obtained from incoming raw material and non-sugars (non-sucrose materials) are progressively concentrated and segregated from the crystallized sugar in molasses or syrups. All process materials except the desired crystalline products and what is known as the "final molasses" are recirculated in the process to recover more of their sugar content, or, from another viewpoint, to effect further elimination of nonsugars from recoverable sugar values. The final molasses is the end material of the process, of low purity, from which additional sugar cannot be obtained economically by further crystallization. It is usually sold or otherwise disposed of at little return to the sugar producer, and in general its content of sucrose governs the extraction of sugar, or yield, from sugar end operations.

The desirability and economy of any particular sugar making process depend upon several interrelated factors, among which are the qualities of the desired product, the purity, or sucrose content, of the final molasses, and the effort and expense involved in recovering the product and segregating non-sugars into the final molasses. In general, the final molasses purity is kept below a more or less fixed point in all processes because of its direct effect on yields and returns, and in all processes there are minimum standards of product quality which must be met. Great variation occurs, however, with respect to effort and expense of manufacture, and this factor becomes troublesome in known processes whenever it is sought to improve the product without raising the final molasses purity. Similarly, attempts to simplify manufacture and to lower costs have often resulted in adverse effects with respect to other important factors, so that the usual process represents a compromise between conflicting tendencies.

Thus there are several known processes for the manufacture of raw cane sugar, but the most common is a three-massecuite process which, in comparison with known two-, four- and five-massecuite processes, usually provides the most satisfactory combination of efficiency factors. The two-massecuite process is simpler, but the product must be of very poor quality in order to keep the final molasses at a suitable purity, and large volumes of massecuite must be boiled and treated for a given output of sugar. The four- and five-massecuite processes produce some sugar of better quality than known three-massecuite processes, but they introduce complications in manufacture. Moreover, all of these processes for producing raw sugar present need for improvement in several important respects. I have found that avoidable reintroduction of once-concentrated non-sugars into higher purity stages of treatment takes place, and that there is too much intermixture of relatively pure and relatively impure materials, so that the directness of the route from incoming raw material to a low purity end material and over-all process efficiency are materially impaired. The only practicable procedure now used for reducing the recirculation of non-sugars is to employ a "double-purging" process on sugar from crystallizer massecuite, but this requires additional work and equipment capacity, also introduces new syrups into the process for sugar recovery, and does not fully overcome the evil. Moreover the usual processes do not permit of continuous control over the quality of materials used in the several massecuite boilings, and they lack the degree of flexibility that would be desirable in a more satisfactory system.

When plantation raw sugar, or "turbanado," is made in a raw sugar factory using the usual three-massecuite process, it is common practice to subject first and second sugars to double-purging treatments in order to obtain a product of suitable quality, and attendant operations produce molasses or syrups which further affect processing efficiency adversely. When refined white sugar is made from the raw sugar, whether near the raw sugar factory or after shipment of the sugar to foreign areas, the raw must be subjected to affination treatment in order to improve its quality and render it suitable for efficient refining.

In view of the above-mentioned and other characteristics which I have found existing in present-day plantation cane sugar manufacture, it is an object of this invention to provide new and improved processes for making raw cane sugar, plantation white sugar or sugar of high purity for direct refining by which the economy and efficiency of sugar manufacture may be greatly increased while producing products of better quality when desired and keeping the final molasses purity at a suitable low point.

Another object of this invention is to provide processes for the manufacture of sugar from meladura which involve the treatment of much less materials than known processes for a given output of sugar and still give a high extraction or yield of crystallized sugar having qualities which may be equal or considerably superior to present-day standards.

Another object is to provide improved processes avoiding to the maximum extent the intermixing of materials of relatively high purity with materials of relatively low purity to form massecuites, and avoiding the recirculation of materials in which impurities have once been concentrated into higher purity stages of treatment. Thus, the most direct route from starting material to a low purity end material is provided, and the functions of the processes are performed with minimum effort, minimum equipment and minimum costs of production.

Another important object of the invention is to provide processes involving novel treatment of crystallizer massecuites and to produce final molasses of usual low purity and a high yield of crystallizer sugar of much greater than usual purity that may be marketed as raw sugar or recirculated to advantage without further treatment, this being accomplished efficiently and economically and without requiring separate treatment of third sugar such as by the double-purging process required in present practice.

Other features of the invention lie in the provision of improved three-massecuite processes for producing cane sugar from syrups which give optimum results in respect of product quality, effort and expense of manufacture, and net yields or extraction of product; in keeping the first, or highest purity, massecuite at a higher purity than in known three-massecuite processes; when making high purity sugar, in regulating and controlling the purity of the second massecuite by fractionation and distribution of centrifugal run-offs to keep the same at a proper purity in relation to a third or crystallizer massecuite of fixed low purity; in eliminating double-purging treatments when making plantation white sugar; and in eliminating affination treatment when making refined sugar.

Still another object of the invention is to provide a three-massecuite process for the manufacture of high purity cane sugar direct from meladura in which each massecuite is boiled from a standard liquor of controlled purity, the liquor for first massecuite being continually produced as a composite of incoming meladura and another process material of controlled purity and the liquor for second and third massecuites being continually produced as composites of other process materials of controlled purities.

Among further features, my improved processes enable greater control over product quality and greater flexibility of operation, permitting ready adaptation for different conditions of operation or for the production of different types of products.

In one embodiment of the invention, raw cane sugar is manufactured from meladura by an optimum three-massecuite process involving the direct production of marketable raw sugar having good keeping and refining qualities from each of the three massecuites, the maintenance of third massecuite at a fixed low purity, and the maintenance of first massecuite at an abnormally high purity. The third, or crystallizer, sugar produced by this process may be blended with first and second sugars and shipped to market, or it may be mingled with meladura and used as seed for first or second massecuite boilings or for both.

In another embodiment of the invention, cane sugar of extra high quality having a purity of 99 to 99.5 is produced directly from the first and second massecuites, and this may either be marketed as plantation raw sugar of better than usual quality or melted and passed through a conventional refining process for the production of refined sugar, without intermediate affination treatment. In this embodiment also the first massecuite is kept at an unusually high purity. The second massecuite is maintained in proper relation to third massecuite purity by fractionation and distribution of centrifugal run-offs. It will be understood that the production, direct from meladura, of sugar that is suitable for refining without affination treatment offers important advantages and economies to the refined sugar producer.

The accompanying drawings present illustrative flow charts indicating the treatment and distribution of materials in the sugar end operations of a cane sugar factory according to several embodiments of my invention, as explained in greater detail hereinafter. The indications of units of equipment in this flow chart are merely diagrammatic. It will be understood that one or more units of each piece of equipment may be used, depending upon the nature and capacity of the equipment and the character and volume of sugar end operations, and also that other equipment and operations which have no material bearing on this invention may be used in any system for practicing the present process.

According to the illustrative embodiments, three-massecuite processes are provided including high-, intermediate- and low-purity massecuites which will be referred to, respectively, as first, second and third, or crystallizer, massecuites. The several massecuite boilings take place in vacuum pans designated on the flow chart by the characters A, B and C, respectively. The vacuum pans are supplied with materials from storage tanks $A^1$, $B^1$ and $C^1$, respectively. The A and B pans discharge their strikes into mixers $A^2$ and $B^2$. The C pan discharges into crystallizer apparatus $C^2$, in which the third, or crystallizer, massecuite is cooled to promote the growth of crystals and the exhaustion of sucrose from the mother liquor, and from this the crystallized third massecuite passes into a mixer $C^3$. Each mixer supplies charges of massecuite to centrifugals, designated $A^4$, $B^4$ and $C^4$ for the respective stages, in which take place the operations of purging mother liquor from sugar crystals and, in some instances, of washing the crystals and fractionating centrifugal run-offs into higher-purity and lower-purity fractions, as described more particularly hereinafter. A tank M is provided for mingling third sugar and meladura when the former is used as seed for first and second massecuite boilings, and a storage tank or mixer S receives seed magma from M and holds it for delivery to the vaccum pan A or B in such cases.

All of the above-mentioned equipment may be constructed in a manner now well-known in the art. It is important, however, that the mixers $A^2$, $B^2$ and $C^3$ be equipped to permit accurate regulation and control over the consistency of the massecuites and to keep uniform the temperature and fluidity of successive charges of massecuite as withdrawn for treatment in the centrifugals. This may be accomplished, with maximum capacity and minimum dissolution of sugar grain, by use of the processes and apparatus disclosed in my United States patents, Reissue No. 20,556 and No. 2,086,951. It is also important that the centrifugals be capable of substantially uniform operation and of efficient elimination of molasses from the particular types of massecuite which they treat, that they be equipped with means for effecting sharp separation around their curb walls between syrups flowing from the walls at different time intervals (except as pointed out below) and that purging, washing and syrup-separating operations in each centrifuging cycle be kept under accurate and timed control and adapted for controlled variation to suit requirements when qualities of the massecuites undergoing treatment are subject to change. Each centrifuging cycle on a particular massecuite that is to be washed in the centrifugals should involve a substantially uniform period during which the sugar crystals are purged of substantially all of the mother liquor that can be eliminated efficiently by centrifugal force, a uniform time and period for applying controlled amounts of wash water after such purging, and a uniform time for actuating the syrup separating means. Centrifugal processes in which the charge being centrifuged is subjected to high centrifugal forces in excess of 800 times its weight may be employed to advantage, particularly at the $C^4$ station. Centrifugal apparatus possessing these operating capacities has been developed by Eugene Roberts and described in his issued patents and pending applications, and is now well-known in the American sugar industry.

The sucrose bearing starting or raw material for the processes herein disclosed consists of concentrated cane juice, or meladura, which enters the sugar end operations of the factory from the evaporators. In the manufacture of raw cane sugar according to an embodiment of this invention, as illustrated diagrammatically in Figure 1 of the drawings, the meladura at a normal purity between about 83 and 89 is passed to storage tank $A^1$, from which it is withdrawn from time to time and introduced into vacuum pan A for boiling into first massecuite. Each strike of first massecuite may be grained by boiling meladura, by leaving a portion of a previous strike in the vacuum pan, or, in another embodiment as described below, by the use of high-purity seed magma from the mixer tank S. In this embodiment the practice of leaving a portion of previous strike in the pan is preferred since it results in raw sugar of larger grain size and better refining qualities. In any event, the first massecuite purity is kept at least as high as the purity of incoming meladura, and somewhat higher in said other embodiment, so that it is possible to produce first sugar having better qualities than obtainable by prior practice. Further, this practice in forming the first massecuite avoids the addition of relatively impure process materials to meladura and thereby increases the extraction of sugar from first massecuite boilings per unit quantity of massecuite and reduces the total amount of massecuite necessary for a given output of sugar, with consequent savings in equipment requirements and in the effort and expense of manufacture.

The boiling operations at A may be carried out in known manner to produce first massecuite of relatively high net crystallization, so that the mother liquor in the massecuite attains a purity about 20 or more points below the massecuite purity. After the massecuite has been formed it is dropped from the vacuum pan at A into the mixer $A^2$, where the temperature and consistency of the material are kept substantially uniform and at a point well suited for efficient centrifuging by means of the improvement disclosed in my prior patents, above identified. Suitably conditioned charges of the massecuite are withdrawn successively from the mixer $A^2$ and treated in the centrifugals $A^4$, which preferably are capable of operation at high speeds and on controlled cycles so as to enable regulation of total molasses elimination.

In the manufacture of raw cane sugar for importation into domestic markets it is usually of little or no value to produce sugar having a polarization much in excess of 97°, since the usual market and duty structures are based upon raw sugar of 96° average polarization. Sugar polarizing 96° to 97° or higher, as desired, is easily obtained from my high purity first massecuite by simple purging without washing, so that no washing is employed at $A^4$ in this embodiment of the invention except under abnormal operating conditions, as when the meladura is much below standard purity or when the massecuite is "smeared" or otherwise boiled in a manner preventing effective centrifuging. Hence centrifugals equipped with washing and syrup separating means and time controls are not required at $A^4$ in this embodiment.

The raw sugar produced at $A^4$ is discharged from the centrifugals and passed onward for bagging, as indicated on the flow chart. The first molasses produced at $A^4$, at a purity between about 63 and 69, is passed directly to the $B^1$ storage tank for use as the principal material for second massecuite boilings.

In preparing the second massecuite, as in the case of the first massecuite, the vacuum pan may be grained by boiling first molasses, by leaving a portion of a previous strike in the pan, or, in another embodiment described below, by using high purity seed magma from S. Again, the massecuite at B is boiled to a relatively high net crystallization, so as preferably to obtain a drop of about 20 points or more between the purity of the second massecuite and the purity of the mother liquor. The dense crystallized massecuite is dropped into the mixer $B^2$, where its temperature and consistency are kept uniform and controlled by use of my patented improvements, and from $B^2$ charges of the massecuite are withdrawn successively and treated in centrifugals at $B^4$. In a small factory the same mixer and centrifugals may be used for both first and second massecuites.

The second massecuite is of such quality that marketable raw sugar of desired polarization and other qualities may normally be produced by simple purging without washing. In no event should any washing required at $B^4$ be sufficient to raise materially the purity of the centrifugal run-offs, so that all run-offs may be collected together as second molasses and passed to the $C^1$ storage tank for use in boiling third massecuites, as indicated on the flow chart.

It will be noted that the massecuite in this embodiment is made entirely from first molasses without combining purer syrups therewith. Thus the most direct concentration of impurities and production of sugar are effected, resulting in maximum extraction with minimum massecuite boiling and centrifuging operations and reducing losses of recoverable sugar, due to inversion and other chemical changes, to a minimum. The use of a single standard syrup for each of the first and second massecuites makes it unnecessary to compound different materials for the boilings and lends extraordinary simplicity to operation.

The second sugar produced at $B^4$ is passed onward for bagging with first sugar. Both first and second sugars, in addition to their desirable polarization, have very good refining qualities due to the high purity and uniform qualities of the crystals themselves, and their keeping qualities and factor of safety $$\left(\frac{\text{moisture}}{100\text{-polarization}}\right)$$

are excellent.

Starting with second massecuite at a purity between 65 and 75 and obtaining a drop of about 20 points or more in the purity of the mother liquor, the second molasses passed to $C^1$ for third massecuite boiling will have a purity between about 45 and 55. This may be somewhat low for use alone in the production of a third sugar of high purity. My preferred practice in preparing the third massecuite, therefore, is to grain the C vacuum pan with a portion of second massecuite drawn from a B strike, this giving high purity seed crystals upon which to build sucrose extracted from syrups from $C^1$ without sacrificing crystallization values obtained by operations at B.

The massecuite purity at C is thus kept at a workable point between about 50 and 60. At this purity, crystallization of sugar cannot be carried out to the optimum point by boiling at C, due to the large concentration of non-sugars and the viscosity of the massecuite. According to usual practice, therefore, the massecuite is boiled at C to develop the grain as far as practicable and then dropped into a crystallizer $C^2$ where it is cooled, with or without stirring, to increase its supersaturation and deposit more sugar on the grain. This, of course, is carried out as far as practicable, and when using my patented improvements for conditioning the massecuite at $C^3$ a state of high density and high net crystallization may be reached without preventing efficient treatment of the massecuite in the centrifugals at $C^4$.

In the practice of my processes it is important to conduct the boiling of the third or crystallizer massecuite so that the massecuite is free from objectionable fine grain or "smear" (false grain). It is also important to avoid "smearing" a properly boiled third massecuite through improper operation of the crystallizers, for reasons which will appear below.

After crystallization at $C^2$ the material passes to mixer $C^3$ where it is reheated immediately before purging to a controlled temperature giving it a good consistency for purging, but without substantial dissolution of sugar grain. Reheated charges from $C^3$ are introduced into the centrifugals at $C^4$ and are centrifuged at high centrifugal forces in a manner ensuring elimination of more than 90% of the mother liquor within a definite time interval. The previous treatment of the massecuite is important to this phase of operations. A smeared massecuite, or one with grain of varying size including very fine grain, is difficult to purge and forms a troublesome skin on the inside of the centrifugal basket due to the resistance of the sugar wall to molasses filtration, and due to the separating effect of high centrifugal forces. A massecuite that has not been reheated to a relatively high temperature before purging does not enable the requisite molasses elimination under efficient operating conditions. By keeping the massecuite of fairly uniform and of medium or large grain size and substantially free of smear, reheating it uniformly under controlled conditions before purging and applying high centrifugal forces in purging the regular elimination of more than 90% of the mother liquor within a definite and comparatively short time interval may be realized. Thereafter, using time-controlled centrifugal operations, a fixed and small amount of wash water is applied to the sugar remaining in the revolving centrifugal. This water should be at a temperature at least as high as, and preferably considerably higher than, the temperature of the reheated massecuite in order to prevent the remaining molasses from cooling and adhering more strongly to the crystals. Within several seconds after the wash water is first applied (e. g., 1 to 3 second) the syrup-separating mechanism on the centrifugal is actuated to divert all syrups subsequently flowing from the curb wall into a separate collecting trough. After completion of washing, the centrifugal may be brought to low speed, and its contents of sugar may be discharged and passed onward for blending with first and second sugars, bagging, and shipment to raw sugar markets.

The third sugar produced by this process regularly attains a polarization of 96° to 97° or higher and a purity of 98 to 99. It has very good refining and keeping qualities, and its factor of safety lies below .33 and usually below .25. The molasses flowing from the curb wall before actuation of the syrup-separating mechanism is collected and disposed of as final molasses. Its purity is at least as low as, and usually somewhat lower, than obtained by present processes, which may be explained by the facts that the mother liquor close to the sugar crystals is more exhausted of sucrose than the remainder of the mother liquor and that the treatment described above, eliminating practically all of the mother liquor before washing, results in a final molasses of somewhat lower purity than otherwise obtained.

The syrup flowing from the curb wall of the centrifugal after actuation of the syrup-separating means attains a purity close to the third massecuite purity. It is collected as a "high third" run-off fraction and returned to the storage tank $C^1$ for admixture with incoming material for third massecuite boilings.

Thus, by the treatment above described, the maximum amount of concentrated impurities is diverted from the process in the final molasses, the maximum proportion of remaining concentrated impurities is segregated from the third sugar in a run-off fraction which may be treated efficiently in the lowest-purity stage of the process, all without increase in final molasses purity or appreciable loss of crystallized sugar values, and a crystallized product of high purity is obtained which may be sent direct to market for refining, or recirculated as described below, without further treatment.

In another embodiment of this invention, as illustrated diagrammatically in Figure 2, the first, and second raw sugars may be bagged and shipped to market, and the high purity third sugar (97 purity or higher) may be passed to mingler tank M for mingling with meladura. The resulting magma of high purity is then passed to storage tank or mixer S, from which portions are withdrawn from time to time and introduced into the A and B vacuum pans for use in the seeding of strikes of first and second massecuite. This practice raises the purity of the first massecuite above the meladura purity and permits further increase in the quality and direct yield of first and second sugars, all without loss of crystallized sugar values inasmuch as most of the third sugar becomes the seed of first and second sugar crystals. Again, the recirculation of once-concentrated impurities is avoided to the optimum extent, and the product of raw sugar of good quality may be carried out with a minimum of massecuite boiling, with maximum yield, and at a minimum of effort and expense.

In still another embodiment of this invention, as illustrated diagrammatically in Figure 3 of the drawings, a three-massecuite process for the production of high purity cane sugar direct from meladura is provided in which the treatment and distribution of process materials take place in a manner ensuring maximum product qualities, maximum yields, and minimum requirements of work and equipment in obtaining such qualities and yields. The crystalline products obtained according to this embodiment may be marketed as plantation white sugar of extraordinarily high quality, or they may be melted and passed directly into a refining process for the production of refined cane sugar without intermediate affination treatment.

The equipment used according to this embodiment may be the same as described hereinabove, except that the centrifugals at $A^4$ and $B^4$ should be equipped with sprayers for applying washing fluid to the sugar, with means for sharply separating syrups flowing from the curb walls, and with adjustable time-controlled means for governing the time for applying a washing fluid and actuating the syrup-separating means in each centrifuging cycle; for example, the same as used at $C^4$ in all embodiments of the invention. Suitable equipment of this type is now well known and is disclosed in the pending application of Eugene Roberts, Serial No. 732,114, filed June 23, 1934, now U. S. Patent No. 2,145,633.

In the embodiment now described, boilings of first, second and third massecuites at A, B and C respectively, are made from standard liquors or syrups, one for each stage, preferably after graining the A and B pans with seed magma from S and the C pan with a portion of massecuite from B.

The liquor for first massecuite is continually formed in the storage tank $A^1$ as a composite of incoming meladura and a "high first" run-off fraction from the first massecuite purgings. The liquor for second massecuite is continually formed in tank $B^1$ as a composite of a "low first" run-off fraction from the first massecuite purgings and a "high second" run-off fraction from the second massecuite purgings. The liquor for third massecuite is continually formed at $C^1$ by combining a "low second" run-off from the second massecuite purgings with the "high third" run-off fraction described hereinabove. High purity seed magma for seeding A and B pans is obtained by mingling high purity third sugar with meladura at M and passing the resulting magma to storage at S, and seed massecuite for use in the C pan may be obtained by cutting over a portion of a strike of second massecuite, as described hereinabove.

In this embodiment of the invention, the purity of the first massecuite is kept considerably higher than the meladura purity, and the purity of the second massecuite is maintained in normal relation to a third massecuite of fixed low purity by fractionation and distribution of centrifugal run-offs. Materials of controlled purities are treated throughout the process, and the process is adapted to produce the optimum results at each stage and to provide a novel correlation of stages resulting in optimum efficiency for the whole.

Boilings at A, B and C and the subsequent treatment of resulting massecuites at $A^2$ and $B^2$ and $C^2$ and $C^3$, respectively, may take place substantially as described in connection with embodiments for the production of raw sugar. At all of the centrifugals, $A^4$, $B^4$ and $C^4$, however, centrifuging operations are carried out so that most of the mother liquor, preferably more than 90%, is regularly eliminated from the respective sugars within a definite time interval for each stage, and thereafter a fixed amount of wash water is applied to the sugar remaining in the centrifugals. The wash water is preferably applied in the form of a fine spray and at a temperature at least as high as the temperature of the massecuite when ready for purging, which increases its effectiveness in removing adhering impurities from the sugar, makes its effect substantially uniform throughout the sugar wall, and minimizes the amount of wash water needed for proper results.

The separation of syrups flowing from the curb walls of the $C^4$ centrifugals is performed in the same manner as in the production of raw sugar, thus producing a final molasses of usual low purity, a "high third" run-off fraction of approximately third massecuite purity, and a third sugar of high purity (at least 97, and generally 98 to 99) by means of a small quantity of wash water and without further treatment of the sugar.

In the centrifuging of the first massecuite the separation of syrups flowing down the curb wall is effected at a predetermined interval after applying the wash water, which is regulated so that a portion of the wash syrup flows into one trough with the bulk of the mother liquor to form the "low first" run-off fraction mentioned above, and so that the remainder of the wash syrup is collected separately, at a controlled and relatively high purity (substantially as high or higher than the first massecuite), as the "high first" run-off fraction. In this manner three materials of distinct and controlled purities are produced from the first massecuite-first sugar of unusually high quality (purity usually 99 to 99.5) and two separate run-off fractions, the high first fraction, consisting essentially of wash syrup, and the low first fraction, consisting essentially of green syrup with a small predetermined amount of wash syrup.

Using high purity seed magma for graining the first massecuite and using a liquor or syrup consisting of meladura and the high first fraction for first massecuite boilings, the purity of the first massecuite will range between 85 and 90, which is considerably higher than available with present practices. The drop in purity from first massecuite to low first fraction is about 20 to not more than 25 points, so that the material leaving the high purity stage for treatment as the principal constituent of second massecuite has a purity range usually between 65 and 70 and not more than 75.

In order to produce a low second run-off fraction of suitable purity (e. g., 45 to 55) for use as the principal material in the boiling of third massecuite of fixed low purity, particularly when the high first fraction is of high purity, the second massecuite is kept at a predetermined purity (from 65 to not more than 75) by control over the separation of syrups flowing from the curb walls of the B⁴ centrifugals. In this instance the syrup separation is effected at a predetermined time before wash syrup resulting from the washing of second sugar is able to reach the trough in which mother liquor, or green syrup, is collected as the low second fraction. Thus, with uniform purging operations, a substantially definite and regulated amount of mother liquor is collected with the wash syrup from the second sugar in each centrifuging cycle to form a high second run-off fraction of substantially predetermined purity and volume. The proportion of mother liquor to be collected with the wash syrup in each cycle depends upon the purity fixed for the third massecuite (and consequently for the second massecuite) and the purity and volume of the low first fraction.

The high second fraction, consisting essentially of wash syrup from second massecuite purgings, is passed directly to storage at B¹ where it is combined with the low first fraction to form the standard liquor for second massecuite boilings. The low second fraction, consisting substantially entirely of mother liquor from second massecuite, is passed to storage at C¹ where it is combined with the high third fraction to form liquor for third massecuite boilings, as already described. The sugar produced at B⁴ is of a high quality comparable to the first sugar, and it attains a purity of at least 99. It is marketed with first sugar as plantation white sugar, or melted with first sugar and refined, without requiring affination treatment.

From the foregoing description of preferred embodiments, it will be understood that the present invention provides processes in which all massecuites are made from materials that are continually produced at controlled purities, and that the cyclical operation of the processes may take place without requiring testing, selection and apportionment of varying materials in order to prepare liquors for massecuite boilings. In keeping with the character of the product required from each stage, the operations at each stage are carried out to give a product of optimum qualities and to effect the maximum segregation of impurities from crystallized sugar values at minimum effort and expense.

The several stages are correlated and the qualities and distribution of recirculated process material are controlled so that the most direct and the most efficient route is followed from the incoming meladura to the low purity end material, the final molasses. In this correlation there is minimum intermingling of relatively impure with relatively pure materials and minimum reintroduction of once-concentrated impurities into higher-purity stages of treatment. Consequently, the volume of massecuite to be boiled and otherwise treated per unit output of desired products is reduced to a minimum, and losses of sugar values through inversion and other chemical changes are minimized.

This invention is not destricted to the use of any particular equipment so long as the equipment to be used possesses the requisite operating capacities. Nor is the invention restricted to features or details of the preferred embodiments, which have been disclosed for purposes of illustration, except as required by a fair construction of the appended claims.

I claim:

1. A three-massecuite process for producing raw cane sugar and final molasses from meladura which comprises boiling first massecuite from incoming meladura, centrifuging the massecuite to produce raw first sugar of at least 96° polarization and first molasses, boiling second massecuite from first molasses, centrifuging second massecuite to produce raw second sugar of at least 96° polarization and second molasses, boiling third massecuite from second molasses and a run-off fraction from third massecuite purgings of about third massecuite purity, cooling and further crystallizing the boiled third massecuite, reheating the same just before centrifuging, purging the reheated third massecuite to extract mother liquor from third sugar and washing the sugar to a polarization of at least 96°, and sharply separating the streams of mother liquor and wash syrup expelled from the sugar to obtain final molasses of usual low purity and the aforesaid run-off fraction, respectively.

2. A three-massecuite process for producing raw cane sugar and final molasses from meladura which comprises boiling first massecuite from incoming meladura, centrifuging the massecuite to produce raw first sugar of at least 96° polarization and first molasses, boiling second massecuite from first molasses, centrifuging second massecuite to produce raw second sugar of at least 96° polarization and second molasses, boiling third massecuite from second molasses and a run-off fraction from third massecuite purgings of about third-massecuite purity, cooling and further crystallizing the boiled third massecuite, reheating the same just before centrifuging, purging the reheated third massecuite to extract mother liquor from third sugar and washing the sugar to a polarization of at least 96°, sharply separating the streams of mother liquor and wash syrup expelled from the sugar to obtain final molasses of usual low purity and the aforesaid run-off fraction, respectively, and blending said first, second, and third raw sugars to obtain raw sugar of at least 96° polarization having good refining and keeping qualities.

3. A three-massecuite process for producing raw cane sugar and final molasses from meladura which comprises boiling first massecuite from incoming meladura on seed sugar of at least 97 purity, centrifuging the massecuite to produce first sugar of at least 96° polarization and first molasses, boiling second massecuite from first molasses on seed sugar of at least 97 purity, centrifuging second-massecuite to produce second sugar of at least 96° polarization and second molasses, boiling third massecuite, on seed provided by a portion of said second massecuite, from second molasses and a run-off fraction from third massecuite purgings of about third massecuite purity, cooling and further crystallizing the boiled third massecuite, reheating the same just before centrifuging, purging the reheated third massecuite to extract at least 90% of the mother liquor from the third sugar and then washing the sugar to a purity of at least 97, sharply separating the streams of mother liquor and wash syrup expelled from the sugar to obtain final molasses of usual low purity and the aforesaid run-off fraction, respectively, and using said third sugar of at least 97 purity as the aforesaid seed sugar.

4. The process as claimed in claim 3, mingling said third sugar of at least 97 purity with meladura to form a seed magma and graining first and second massecuites with said magma to provide the aforesaid seed sugar.

5. A three-massecuite process for producing raw cane sugar and final molasses from meladura which comprises boiling first massecuite of at least meladura purity from incoming meladure, on seed sugar of at least 97 purity, and centrifuging the massecuite to produce first sugar of at least 96° polarization and first molasses of about 20 or more points lower purity than the first massecuite, boiling second massecuite from first molasses on seed sugar of at least 97 purity, and centrifuging the same to produce second sugar of at least 96° polarization and second molasses of about 20 or more points lower purity than the second massecuite, boiling third massecuite, on seed provided by a portion of said second massecuite, from said second molasses and a run-off fraction from third massecuite purgings of about third-massecuite purity, cooling and further crystallizing the boiled third massecuite, reheating the same just before centrifuging, purging the reheated massecuite to extract at least 90% of the mother liquor from the third sugar and then washing the sugar to a purity of at least 97, sharply separating the streams of mother liquor and wash syrup expelled from the sugar so as to obtain final molasses of usual low purity and the aforesaid run-off fraction, respectively, and using said third sugar on the aforesaid seed sugar.

6. In the production of cane sugar and final molasses by a succession of massecuite boiling and centrifuging operations in three stages at successively lower purities, the steps which comprise washing the sugar in the centrifugals at the lowest-purity, or crystallizer, stage to a purity of at least 97, separating centrifugal run-offs into a lower-purity fraction consisting substantially entirely of mother liquor and a higher-purity fraction of a purity near the crystallizer massecuite purity consisting essentially of wash syrup, withdrawing the lower-purity fraction from process as final molasses of optimum low purity; and returning the higher purity fraction for boiling into further stripes of crystallizer massecuite.

7. In the production of cane sugar and final molasses by a succession of massecuite boiling and centrifuging operations in stages at successively lower purities, the steps which comprise boiling the lowest-purity, or crystallizer, massecuite to produce a massecuite substantially free of very small grain, cooling and further crystallizing the massecuite, reheating successive portions of the massecuite before centrifuging, purging more than 90% of the mother liquor from the reheated massecuite in a centrifugal, thereafter applying a fixed amount of washing liquid to the sugar in the revolving centrifugal and washing the sugar to a purity of at least 97, sharply separating the resulting wash syrup from the preceding mother liquor as they flow from the centrifugal curb and collecting the same, respectively, as a centrifugal run-off fraction of a purity near the crystallizer massecuite purity and as final molasses, and recirculating said run-off fraction for boiling into crystallizer massecuite.

8. In the production of high purity cane sugar and final molasses from meladura by a succession of massecuite-boiling and centrifuging operations in three stages at successively lower purities, the steps which comprise passing meladura to the highest-purity stage, washing the sugar in centrifugals at each stage to a purity of at least 97, separating centrifugal run-offs at each stage into higher-purity and lower-purity fractions of predetermined controlled purities, withdrawing the lower-purity fraction at the lowest stage from process as final molasses, passing the lower-purity fractions from the other stages to the stages next below for boiling into massecuites, and returning the higher purity fractions for boiling into massecuites at the respective stages.

9. A three-massecuite process for producing high purity cane sugar and final molasses from meladura which comprises fixing the purity of the third massecuite for the production of final molasses of optimum low purity, washing the sugar from each massecuite in centrifugals, making the first massecuite from meladura and process materials of considerably greater purity than the meladura including high purity seed sugar and a run-off fraction consisting substantially entirely of high purity wash syrup from the first purgings, maintaining the second massecuite at a normal purity in relation to the fixed purity of the third massecuite by making the same from high purity seed sugar, a run-off fraction consisting essentially of mother liquor from the first purgings, and a run-off fraction of regulated purity from the second purgings consisting of predetermined proportions of mother liquor and wash syrup, making said third massecuite from a run-off fraction consisting of mother liquor from the second purgings, a portion of said second massecuite as seed and a run-off fraction consisting essentially of wash syrup from the third purgings, and using washed third sugar at a purity of at least 97 as the aforesaid high purity seed sugar.

10. A three-massecuite process for producing high purity cane sugar and final molasses from the meladura which comprises boiling first massecuite, on seed sugar of high purity, from incoming meladura and a "high first" run-off fraction, purging mother liquor from the massecuite, washing the first sugar in centrifugals and continually fractionating centrifugal run-offs to produce first sugar of at least 99 purity, a "low first" run-off fraction consisting essentially of mother liquor and said "high first" run-off fraction consisting substantially entirely of wash syrup, boiling second massecuite, on seed sugar of high purity, from said "low first" fraction and a "high second" run-off fraction, purging mother liquor from the second massecuite, washing the second sugar in centrifugals and continually fractionating centrifugal run-offs to produce second sugar of about 99 purity, a "low second" run-off fraction consisting substantially entirely of mother-liquor and said "high second" fraction consisting essentially of wash syrup, boiling third massecuite, on seed provided by a portion of said second massecuite, from said "low second" fraction and a "high third" run-off fraction, cooling and further crystallizing the boiled third massecuite, reheating the same just before centrifuging, purging the reheated third massecuite to extract at least 90% of the mother liquor from the third sugar, washing the sugar to a purity of at least 97 and continually fractionating centrifugal run-offs, to produce high purity third sugar, said "high third" run-off fraction consisting essentially of wash syrup, and final molasses consisting substantially entirely of mother liquor, and using said third sugar as the aforesaid seed sugar.

11. A three-massecuite process for producing high purity cane sugar and final molasses from meladura which comprises boiling first massecuite, on seed sugar of high purity, from a liquor consisting of incoming meladura and a "high first" run-off fraction, purging mother liquor from the massecuite, washing the first sugar in centrifugals and continually fractionating centrifugal run-offs to produce first sugar of at least 99 purity, a "low first" run-off fraction consisting essentially of mother liquor and said "high first" run-off fraction consisting substantially entirely of wash syrup at about first-massecuite purity, boiling second-massecuite, on seed sugar of high purity, from a liquor consisting of said "low first" fraction and a "high second" run-off fraction, purging mother liquor from the second massecuite, washing the second sugar in centrifugals and continually fractionating centrifugal run-offs to produce second sugar of about 99 purity, a "low second" run-off fraction consisting substantially entirely of mother liquor and said "high second" fraction consisting essentially of wash syrup at about second massecuite purity, boiling third massecuite, on seed provided by a portion of said second massecuite, from a liquor consisting of said "low second" fraction and a "high third" run-off fraction, cooling and further crystallizing the boiled third massecuite, reheating the same just before centrifuging, purging the reheated third massecuite to extract at least 90% of the mother liquor from the third sugar, washing the sugar to a purity of at least 97 and continually fractionating centrifugal run-offs to produce high purity third sugar, said "high third" run-off fraction consisting essentially of wash syrup, and final molasses consisting substantially entirely of mother liquor, and using said third sugar as the aforesaid seed sugar.

GEORGE E. STEVENS.